United States Patent
Alwan et al.

(10) Patent No.: US 11,679,660 B2
(45) Date of Patent: Jun. 20, 2023

(54) THREE DIMENSIONAL BACKUP STRUCTURE JOINT SYSTEM FOR BATTERY ELECTRIC VEHICLES

(71) Applicant: Ford Global Technologies, LLC, Dearborn, MI (US)

(72) Inventors: Jamil M. Alwan, Ann Arbor, MI (US); Jeffrey Wrenbeck, Royal Oak, MI (US); Joseph Prescott Hickey, Westland, MI (US); Chelliah Madasamy, Canton, MI (US); Djamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 17/340,312

(22) Filed: Jun. 7, 2021

(65) Prior Publication Data

US 2022/0388384 A1 Dec. 8, 2022

(51) Int. Cl.
*B62D 27/02* (2006.01)
*B60K 1/04* (2019.01)
*B62D 25/04* (2006.01)

(52) U.S. Cl.
CPC ............... *B60K 1/04* (2013.01); *B62D 25/04* (2013.01); *B62D 27/023* (2013.01); *B60K 2001/0438* (2013.01)

(58) Field of Classification Search
CPC . B60K 2001/0438; B60K 1/04; B60L 3/0015; B62D 27/023; B62D 21/15
See application file for complete search history.

(56) References Cited

U.S. PATENT DOCUMENTS

| | | | |
|---|---|---|---|
| 7,267,394 B1 * | 9/2007 | Mouch | B62D 25/082 296/203.02 |
| 9,446,643 B1 | 9/2016 | Vollmer | |
| 9,926,017 B1 * | 3/2018 | Hamilton | B62D 25/20 |
| 10,494,034 B2 * | 12/2019 | Makowski | H01M 50/249 |
| 2012/0161472 A1 * | 6/2012 | Rawlinson | B60R 16/04 296/187.08 |
| 2012/0169089 A1 * | 7/2012 | Rawlinson | B62D 25/087 296/193.08 |
| 2013/0088045 A1 * | 4/2013 | Charbonneau | B62D 25/2036 296/187.12 |

(Continued)

FOREIGN PATENT DOCUMENTS

CN 104648480 5/2015

*Primary Examiner* — Jeffrey J Restifo
(74) *Attorney, Agent, or Firm* — Burris Law, PLLC

(57) ABSTRACT

A structural assembly for use in an electric vehicle having a lower body frame and a battery pack secured within the lower body frame. The structural assembly includes a subframe rear mount, a battery cage longitudinal member, a rocker, a hinge pillar, and a rail torque unit. The battery cage longitudinal member is secured to the subframe rear mount. The rocker extends along and is secured to the battery cage longitudinal member. The hinge pillar includes a lower portion that is secured to the rocker. The rail torque includes an s-brace and an inner rail. The s-brace is secured to the hinge pillar at one end and to the inner rail at another end. The inner rail is secured to the hinge pillar at one end and is configured to extend around a wheel of the electric vehicle and form a portion of a wheel well.

20 Claims, 5 Drawing Sheets

(56) References Cited

U.S. PATENT DOCUMENTS

| | | | |
|---|---|---|---|
| 2013/0119757 A1* | 5/2013 | Tachikawa | B60L 3/0015 |
| | | | 307/9.1 |
| 2017/0120951 A1* | 5/2017 | Ashraf | B62D 21/07 |
| 2017/0247057 A1* | 8/2017 | Tatsuwaki | B62D 27/065 |
| 2018/0194211 A1* | 7/2018 | Hamilton | B60L 50/66 |
| 2018/0194212 A1* | 7/2018 | Hamilton | B60N 2/015 |
| 2018/0215245 A1* | 8/2018 | Sudhindra | B60L 50/64 |
| 2019/0144038 A1* | 5/2019 | Takahashi | B62D 25/025 |
| | | | 296/193.07 |
| 2019/0300065 A1* | 10/2019 | Yamauchi | B62D 25/081 |
| 2020/0353995 A1* | 11/2020 | Alwan | B62D 25/04 |
| 2022/0032758 A1* | 2/2022 | Kaneko | B62D 21/11 |
| 2022/0097770 A1* | 3/2022 | Renn | B60R 19/24 |
| 2022/0388384 A1* | 12/2022 | Alwan | B62D 27/023 |

\* cited by examiner

THREE DIMENSIONAL BACKUP STRUCTURE JOINT SYSTEM FOR BATTERY ELECTRIC VEHICLES

FIELD

The present disclosure relates to a three dimensional backup structure joint system for battery electric vehicles.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these issues related to the integration of rechargeable battery packs in electric vehicles.

SUMMARY

This section provides a general summary of the disclosure and is not a comprehensive disclosure of its full scope or all of its features.

The present disclosure provides a structural assembly that directs loads away from the battery pack during operation of an electric vehicle.

In one form, a structural assembly is disclosed for use in an electric vehicle having a lower body frame and a battery pack secured within the lower body frame extending across a front suspension of the electric vehicle. The structural assembly comprises a subframe rear mount, a battery cage longitudinal member, a hinge pillar and a rail torque unit. The battery cage longitudinal member is secured to the subframe rear mount. The rocker extends along and is secured to the battery cage longitudinal member. The hinge pillar comprises a lower portion that is secured to the rocker. The rail torque unit comprises an s-brace and an inner rail. The s-brace is secured to the lower portion of the hinge pillar at one end and to the inner rail at another end. The inner rail is secured to the lower portion of the hinge pillar at one end and is configured to extend around a wheel of the electric vehicle and form a portion of a wheel well.

In variations of the structural assembly of the above paragraph, which may be implemented individually or in any combination: the structural assembly further comprises at least one inner strap comprising opposed flanges; the opposed flanges are secured to opposed walls of the lower portion of the hinge pillar; the structural assembly further comprises a compression tube extending between the opposed flanges of the inner strap; the compression tube is welded to the inner strap; the structural assembly further comprises an integral bulkhead disposed on an interior portion of the s-brace; the integral bulkhead is a separate component welded to the s-brace; the s-brace is secured to the inner rail and the lower portion of the hinge pillar with mechanical fasteners; the s-brace comprises integral stiffening beads; the structural assembly further comprises an inner rocker and a tube cap; the inner rocker extends along an inboard portion of the rocker; the tube cap is secured to a front end portion of the inner rocker; the tube cap is further secured to the lower portion of the hinge pillar; the structural assembly further comprises a compression tube extending through the tube cap and between the inner rocker and the rocker; the structural assembly further comprises a pillar reinforcement secured to an inner side of the lower portion of the hinge pillar; the subframe rear mount, the battery cage longitudinal member, the rocker, the hinge pillar, and the rail torque unit are secured to each other with mechanical fasteners; the s-brace is secured to an exterior of the lower portion of the hinge pillar; and the subframe rear mount is a separate component secured at one end to a subframe and at its other end to the battery cage longitudinal member.

In another form, a structural assembly is disclosed for use in an electric vehicle having a lower body frame and a battery pack secured within the lower body frame extending across a front suspension of the electric vehicle. The structural assembly comprises a subframe rear mount, a battery cage longitudinal member, a hinge pillar, a rail torque unit, and at least one inner strap. The battery cage longitudinal member is secured to the subframe rear mount. The rocker extends along and is secured to the battery cage longitudinal member. The hinge pillar comprises a lower portion that is secured to the rocker. The rail torque unit comprises an s-brace and an inner rail. The s-brace is secured to the lower portion of the hinge pillar at one end and to the inner rail at another end. The inner rail is secured to the lower portion of the hinge pillar at one end and is configured to extend around a wheel of the electric vehicle and form a portion of a wheel well. The inner strap comprises opposed flanges. The opposed flanges are secured to opposed walls of the lower portion of the hinge pillar.

In some configurations of the structural assembly of the above paragraph, the structural assembly further comprises a compression tube extending between the opposed flanges of the inner strap.

In yet another form, the present disclosure provides an electric vehicle having a lower body frame, a battery pack, and a subframe. The battery pack is secured within the lower body frame and the subframe extends across a front suspension of the electric vehicle. The electric vehicle comprises a subframe and opposed structural assemblies. The subframe extends from a front end of the electric vehicle proximate a front end portion of the battery pack. The subframe comprises opposed arms extending along opposed front wheel wells of the electric vehicle. Each structural assembly comprises a subframe rear mount, a battery cage longitudinal member, a rocker, a hinge pillar, and a rail torque unit. The subframe rear mount is secured to an end of one of the opposed arms of the subframe. The battery cage longitudinal member is secured to the subframe rear mount. The rocker extends along and is secured to the battery cage longitudinal member. The hinge pillar comprises a lower portion that is secured to the rocker. The rail torque unit comprises an s-brace and an inner rail. The s-brace is secured to the lower portion of the hinge pillar at one end and to the inner rail at another end. The inner rail is secured to the lower portion of the hinge pillar at one end and is configured to extend around a wheel of the electric vehicle and form a portion of a wheel well.

In variations of the electric vehicle of the above paragraph, which may be implemented individually or in any combination: each structural assembly further comprises at least one inner strap comprising opposed flanges; the opposed flanges are secured to opposed walls of the lower portion of the hinge pillar; each structural assembly further comprises a compression tube extending between the opposed flanges of the inner strap; and each structural assembly further comprises an integral bulkhead disposed on an interior portion of the s-brace.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
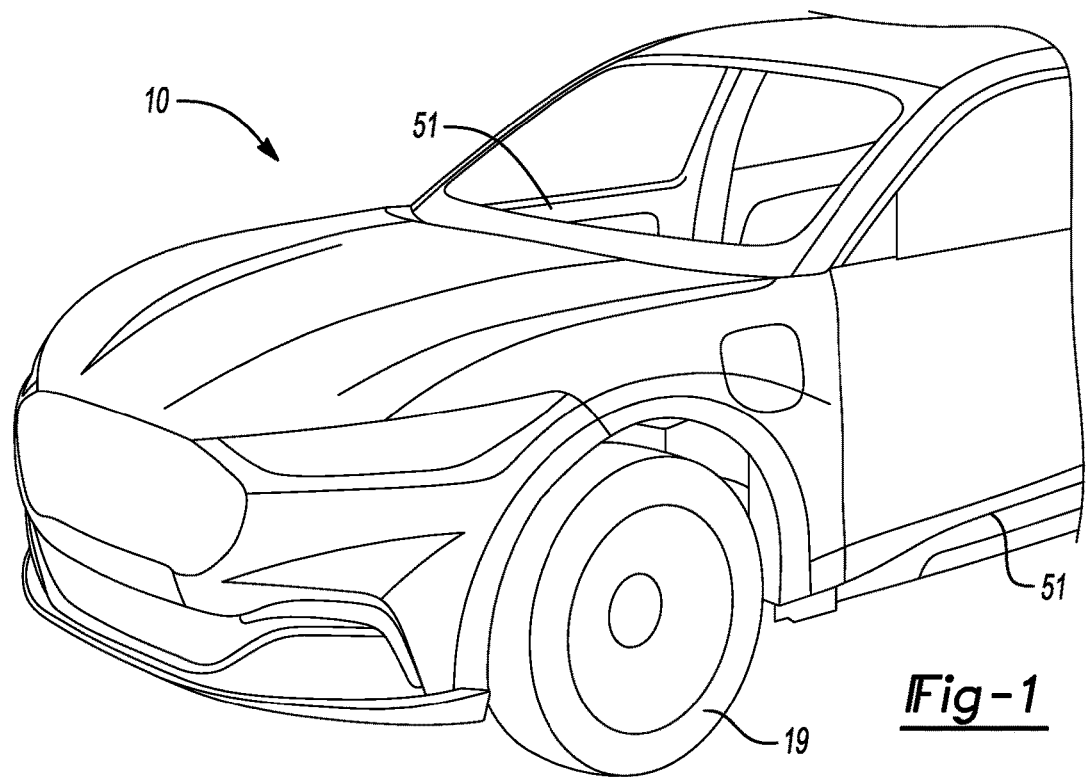
FIG. 1 is a perspective view of a portion of a vehicle including a structural assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
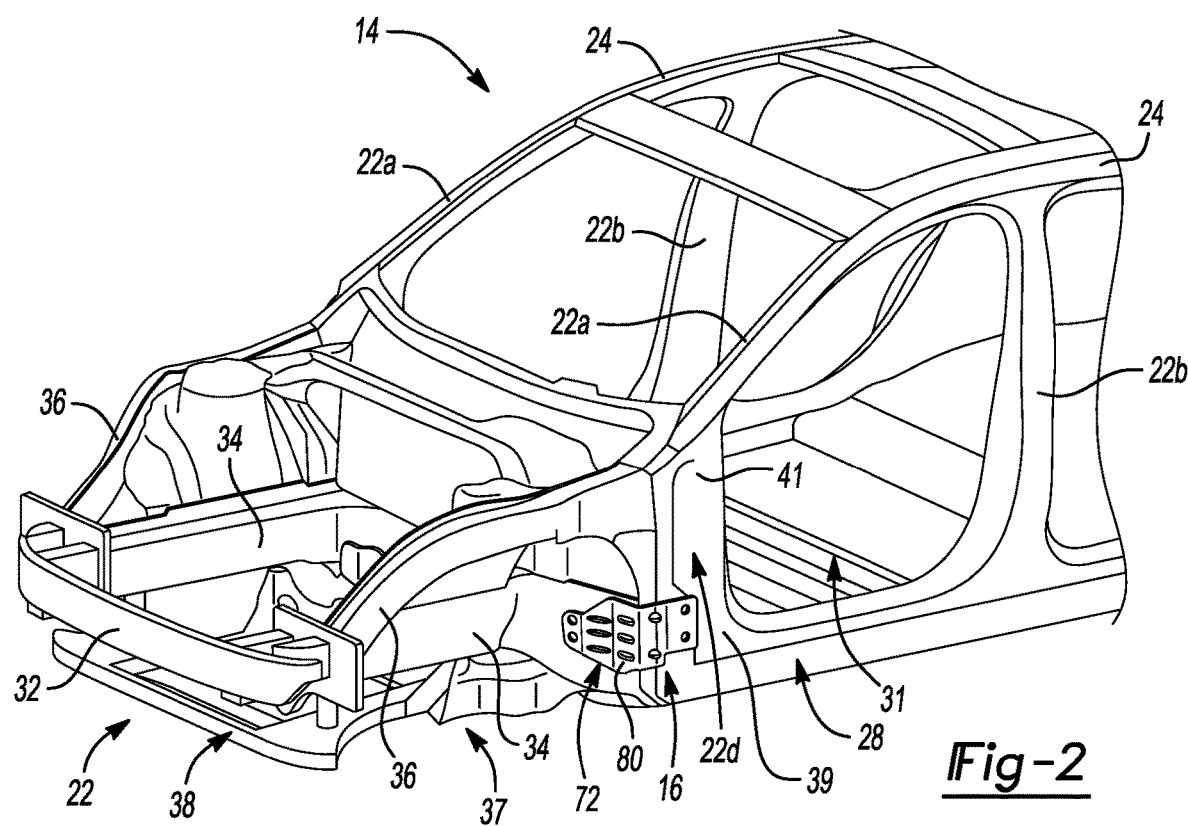
FIG. 2 is a perspective view of a vehicle frame of the vehicle of FIG. 1.
Figure 3:
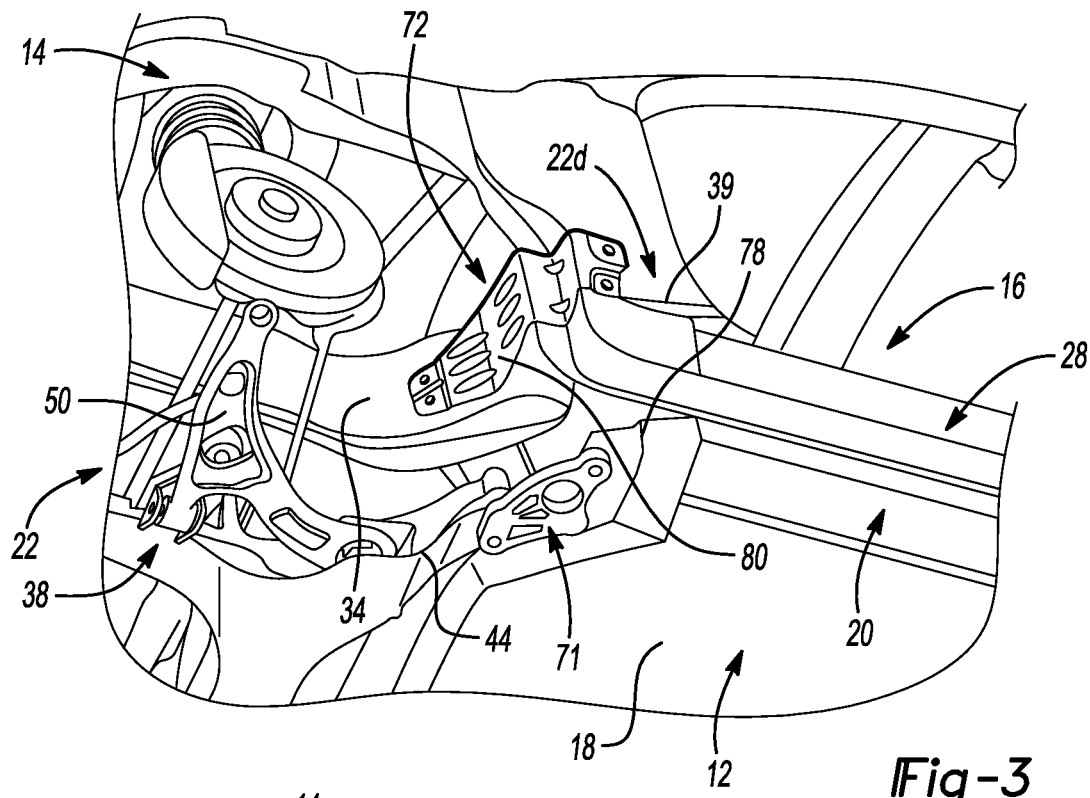
FIG. 3 is a perspective view of a portion of the structural assembly according to the teachings of the present disclosure.
Figure 4:
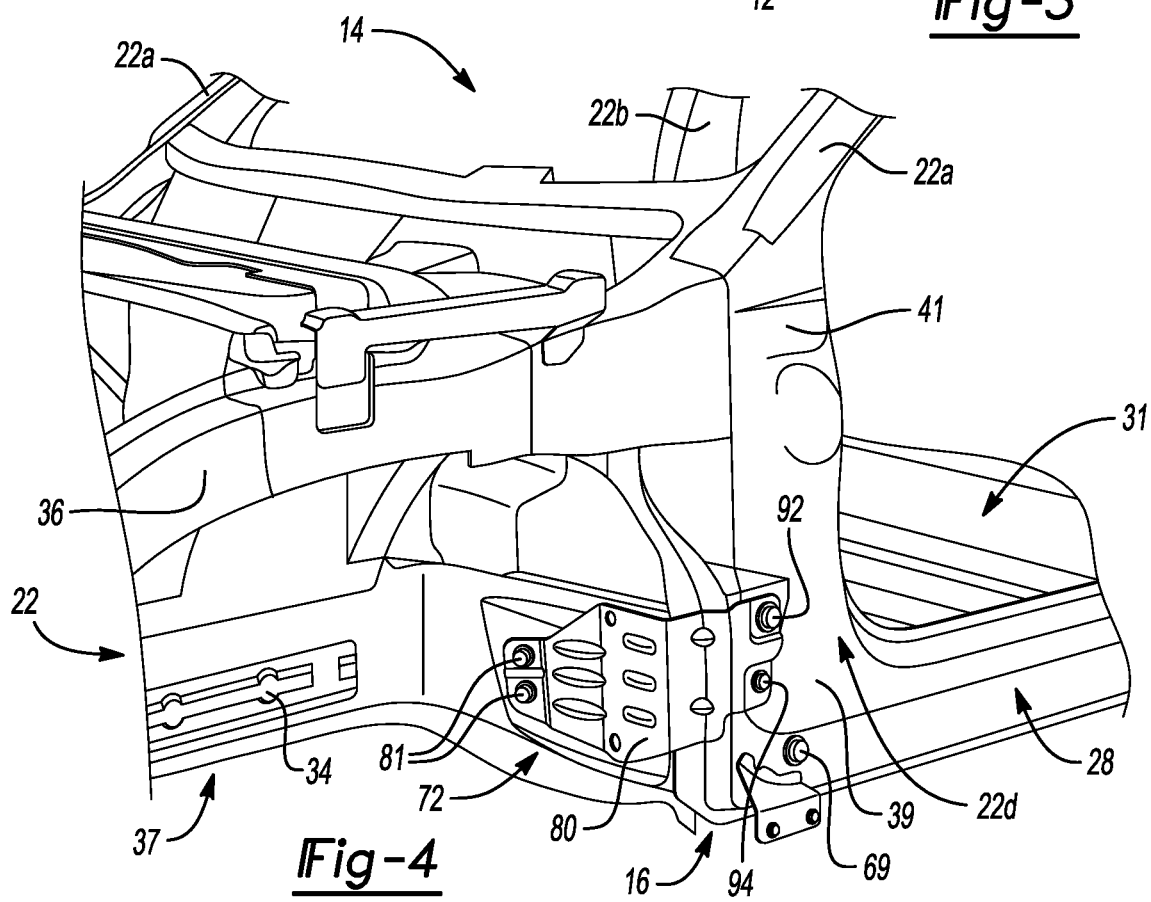
FIG. 4 is a perspective view of a portion of the vehicle frame of FIG. 2.
Figure 5:
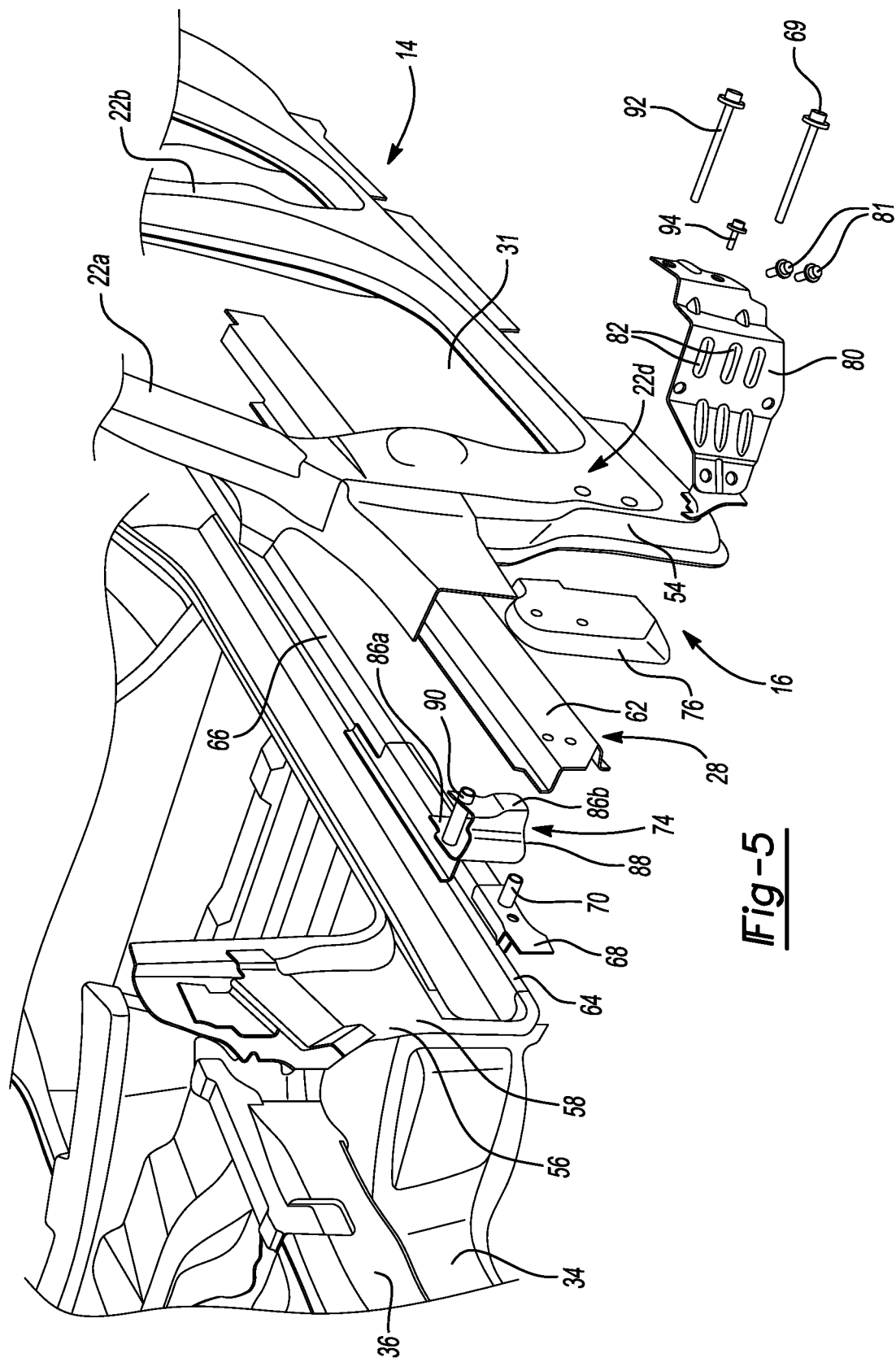
FIG. 5 is an exploded view of a portion of the structural assembly of FIG. 3.
Figure 6:
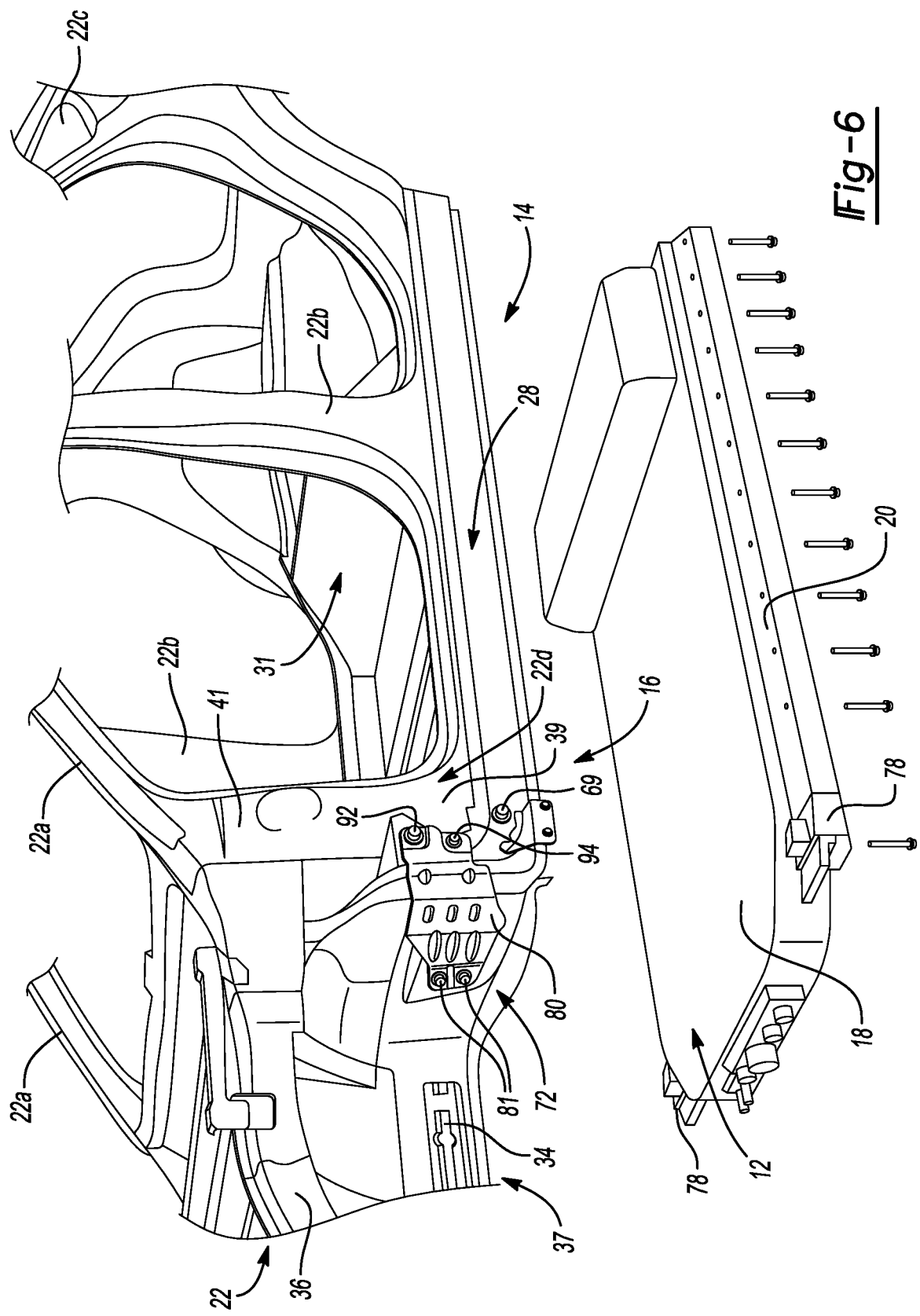
FIG. 6 is perspective view of the vehicle frame of FIG. 2 with a battery pack exploded therefrom.
Figure 7:
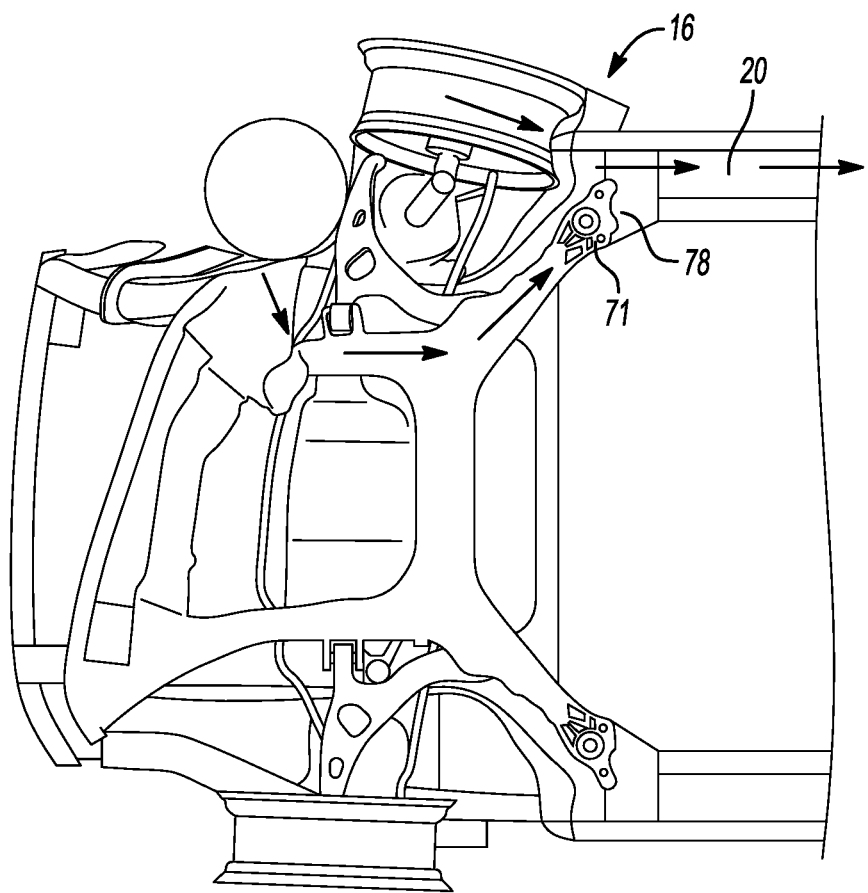
FIG. 7 is a bottom view of the vehicle frame of FIG. 2 showing load paths during operation of the vehicle.

With reference to FIGS. 1-8, a vehicle 10 (FIG. 1) such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a battery pack 12 (FIGS. 3 and 6), a vehicle frame 14, and a structural assembly 16. The battery pack 12 may be rechargeable and may include lithium-ion batteries or any other suitable electrical power storage units. The battery pack 12 may be disposed at various locations of the vehicle 10 and may be mounted to the vehicle frame 14. In this way, the battery pack 12 is supported by the vehicle frame 14 and is remote from a passenger cabin (not shown) and cargo compartments (not shown) of the vehicle 10, therefore, not occupying space that would otherwise be available for passengers or cargo. The battery pack 12 powers a rear motor (not shown) to drive a set of rear wheels (not shown). Similarly, the battery pack 12 powers a front motor (not shown) to selectively drive a set of front wheels 19 (only one front wheel 19 shown in FIG. 1). With reference to FIGS. 3, 6, and 7, the battery pack 12 includes an outer support frame 18 (FIGS. 3 and 6) and a pair of battery cage longitudinal members 20. The pair of battery cage longitudinal members 20 extend along opposing sides of the outer support frame 18, and are secured to the outer support frame 18 and the vehicle frame 14.

With reference to FIGS. 1-8, the vehicle frame 14 includes a front end 22, a plurality of pillars (e.g., A-pillars 22a, B-pillars 22b, C-pillars 22c (FIG. 6), hinge pillars 22d (only one shown in the figures)), roof rails 24, rockers 28. The front end 22 includes a bumper 32, a pair of opposed beams or inner rails 34, a pair of opposed upper rails 36, and a subframe 38. The bumper 32 extends in a transverse direction relative to a longitudinal direction of the vehicle 10 and is secured to front ends of the pair of beams 34. Each beam 34 extends from a lower portion 39 of a respective hinge pillar 22d to the bumper 32. Each beam 34 is also arcuate and extends around a front wheel 19 of the vehicle 10 and forms a portion of a respective front wheel well 37. The upper rails 36 are positioned above the beams 34 and extend from an upper portion 41 of a respective hinge pillar 22d to a front end of a respective beam 34. The upper rails 36 also form a portion of a respective front wheel well 37.

With reference to FIGS. 2, 3 and 7, the subframe 38 extends across a front suspension (not shown) of the vehicle 10 proximate a front end portion of the battery pack 12 and is secured to the pair of battery cage longitudinal members 20 and the pair of beams 34. The subframe 38 may support one or more components of the vehicle 10 such as the front motor and the front suspension, for example.

As best shown in FIG. 7, the subframe 38 includes a pair of opposed lateral members 40, a plurality of connecting members 42, and a pair of opposed arms 44. The lateral members 40 extend generally along the longitudinal direction of the vehicle 10 and are interconnected via the connecting members 42 extending in a transverse direction relative to the longitudinal direction of the vehicle 10. Front ends of the lateral members 40 are secured to the front end of the beams 34. Each arm 44 extends from a rear end of a respective lateral member 40 and extends along a respective front wheel well 37 of the vehicle 10. Each arm 44 is also secured to a respective battery cage longitudinal member 20. Control arms 50 (only one shown in FIG. 3) are coupled to the subframe 38 at one end and to a respective front wheel 19 at another end, thereby securing the front wheel 19 to the vehicle 10.

The A-pillars 22a, the B-pillars 22b, the hinge pillars 22d, the rockers 28 and the roof rails 24 cooperate to define door openings 31 in the vehicle frame 14. Doors 51 are rotatably coupled to the hinge pillars 22d between a closed position (FIG. 1) in which the doors 51 are disposed within the door openings 31 and an open position (not shown) in which the doors 51 are removed from the door openings 31. As best shown in FIG. 5, each hinge pillar 22d includes an outer member 54 and an inner member 56 that is secured to the outer member 54 via welding. In some configurations, the outer member 54 and the inner member 56 may be secured to each other via mechanical fasteners or any other suitable attachment means. The outer member 54 and the inner member 56 define a cavity 58 that houses a portion of the structural assembly 16.

Each rocker 28 is elongated and extends along the longitudinal direction of the vehicle 10. The rocker 28 is also secured to a respective battery cage longitudinal member 20.

A front end of the rocker 28 is housed within and secured to a respective hinge pillar 22*d* (i.e., the front end of the rocker 28 is disposed within the cavity 58 of the respective hinge pillar 22*d*). The rocker 28 is secured to the respective battery cage longitudinal member 20 and the lower portion 39 of the respective hinge pillar 22*d* with mechanical fasteners.

As best shown in FIG. 5, the rocker 28 includes an outer member 62, an inner member 64, and an inner rocker 66. The outer member 62 is secured to the inner member 64 via welding. In some configurations, the outer member 62 is secured to the inner member 64 with mechanical fasteners. The inner member 64 is secured to the battery cage longitudinal member 20. The inner rocker 66 is housed within a cavity formed via the outer and inner members 62, 64, and extends along an inboard portion of the outer member 62. A tube cap 68 is secured to a front end portion of the inner rocker 66. The tube cap 68 is further secured to the lower portion 39 of the hinge pillar 22*d* (i.e., the tube cap 68 is secured to an inboard portion of the outer member 54 of the hinge pillar 22*d*). A compression tube 70 extends through the tube cap 68 and between the inner rocker 66 and the outer member 62 of the rocker 28. The compression tube 70 may be welded to the tube cap 68 and may absorb side impact of the vehicle 10. A fastener 69 extends through the outer and inner members 54, 56 of the hinge pillar 22*d*, a respective pillar reinforcement 76 of a pair of pillar reinforcements 76, the outer and inner members 62, 64 of the rocker 28, the inner rocker 66 and the compression tube 70. A nut (not shown) is secured to the fastener 69 to secure the outer and inner members 54, 56 of the hinge pillar 22*d*, the respective pillar reinforcement 76, the outer and inner members 62, 64 of the rocker 28, the inner rocker 66, and the compression tube 70 to each other.

The structural assembly 16 includes the battery cage longitudinal members 20, the rockers 28, the hinge pillars 22*d*, a pair of subframe rear mounts 71 (only one shown in FIG. 3), a pair of rail torque units 72, a plurality of inner straps 74 (only one shown in FIG. 5), and the pair of pillar reinforcements 76. Each subframe rear mount 71 is a separate component secured at one end to a respective arm 44 of the subframe 38 and at its other end to a respective battery cage longitudinal member 20 via a fitting 78. The subframe rear mount 71 is secured to the respective arm 44 and the respective battery cage longitudinal member 20 with mechanical fasteners. The fitting 78 may be a separate component secured to the battery cage longitudinal member 20 or may be integral with the battery cage longitudinal member 20 (i.e., the fitting 48 and the battery cage longitudinal member 20 make up a unitized component).

Figure 8:
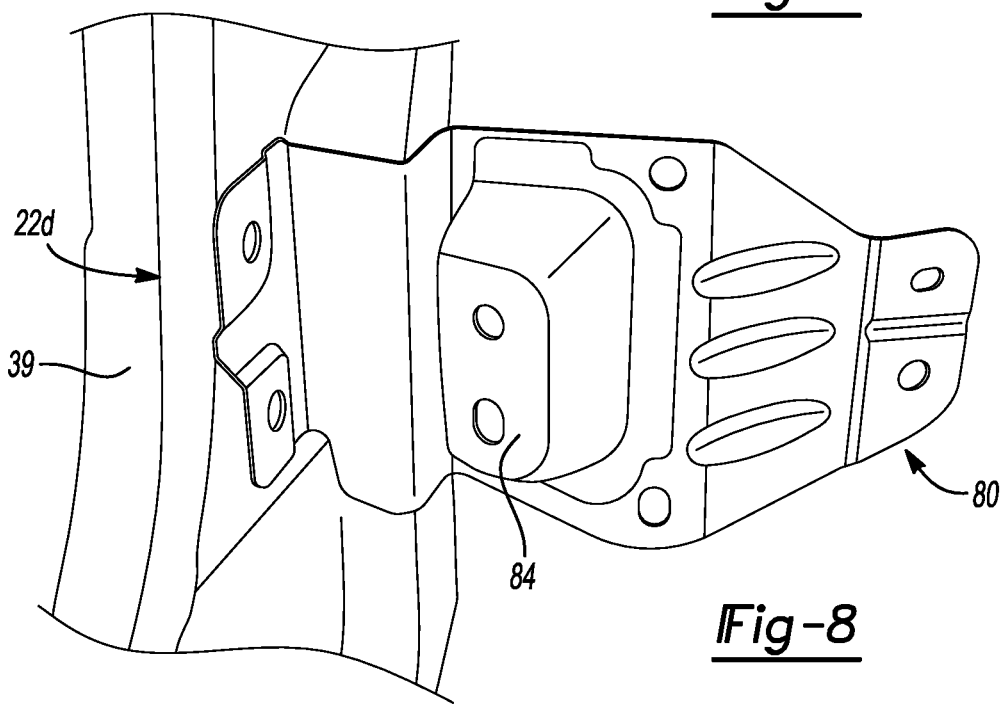
FIG. 8 is a perspective view of an s-brace of the structural assembly of FIG. 3.

Each rail torque unit 72 includes an s-brace or s-strap 80 and a respective inner beam 34. The s-brace 80 wraps around the hinge pillar 22*d* and is secured to the lower portion 39 of the hinge pillar 22*d* at one end (i.e., secured to the outer member 54 of the hinge pillar 22*d*) and to the respective inner beam 34 at another end via mechanical fasteners 81. The s-brace 80 also includes stiffening beads 82. As shown in FIG. 8, an integral bulkhead 84 is a separate component welded to an interior portion of the s-brace 80 (the interior portion faces toward the vehicle frame 14). The integral bulkhead 84 is configured to add stiffness and strength to the hinge pillar 22*d*.

As shown in FIG. 5, each inner strap 74 is U-shaped and is made of a metal material such as high-strength low-alloy (HSLA) steel, for example. The inner strap 74 is disposed in the cavity 58 defined by the outer member 54 and the inner member 56 of the hinge pillar 22*d* and includes opposed flanges 86*a*, 86*b* interconnected via a connecting member 88. The flange 86*a* is secured to a wall of the inner member 56 of the hinge pillar 22*d* and the flange 86*b* is secured to a wall of the outer member 54 of the hinge pillar 22*d*. The flanges 86*a*, 86*b* may be secured to the inner and outer members 56, 54, respectively, via welding, for example. A compression tube 90 extends between the opposed flanges 86*a*, 86*b* of the inner strap 74 and is welded to the inner strap 74 (i.e., welded to the opposed flanges 86*a*, 86*b* of the inner strap 74). The compression tube 90 may absorb side impact of the vehicle 10.

Each pillar reinforcement 76 is disposed in the cavity 58 defined by the outer member 54 and the inner member 56 of a respective hinge pillar 22*d* and is secured to the lower portion 39 of the hinge pillar 22*d* (i.e., secured to an inner side of the outer member 54 of the hinge pillar 22*d* at the lower portion 39). A fastener 92 extends through the s-brace 80, the outer and inner members 54, 56 of the hinge pillar 22*d*, the pillar reinforcement 76, the opposed flanges 86*a*, 86*b*, and the compression tube 90. A nut (not shown) is secured to the fastener 92 to secure the s-brace 80, the outer and inner members 54, 56 of the hinge pillar 22*d*, the pillar reinforcement 76, the opposed flanges 86*a*, 86*b*, and the compression tube 90 to each other. A fastener 94 that is shorter in length than the fastener 92 extends through the s-brace 80, the outer member 54 of the hinge pillar 22*d*, the pillar reinforcement 76, and the flange 86*b*. A nut (not shown) is secured to the fastener 94 to further secure the s-brace 80, the outer member 54 of the hinge pillar 22*d*, the pillar reinforcement 76, and the flange 86*b* to each other.

As shown in FIG. 7, and also referencing FIG. 6, the structural assembly 16 of the present disclosure provides load paths for distributing loads during operation, such as by way of example, a small offset rigid barrier (SORB) mode. The structural assembly 16 distributes the loads (shown by the arrows marked "L") from the wheel to the rail torque unit 72, to the lower portion of the hinge pillar 22*d*, to the rocker 28, and then to the battery cage longitudinal member 20. Further, loads from the wheel are distributed through the subframe 38, into the subframe rear mount 71, into the fitting 78, and then into the battery cage longitudinal member 20. That is, the unique location and attachment of these structural elements cause the loads from the SORB mode to be distributed into the structural assembly 16 and away from the battery pack 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for use in an electric vehicle having a lower body frame and a battery pack secured within the lower body frame and a subframe extending across a front suspension of the electric vehicle, the structural assembly comprising:
    a subframe rear mount;
    a battery cage longitudinal member secured to the subframe rear mount;
    a rocker extending along and secured to the battery cage longitudinal member;
    a hinge pillar comprising a lower portion, the lower portion of the hinge pillar secured to the rocker; and
    a rail torque unit comprising an s-brace and an inner rail, the s-brace being secured to the lower portion of the hinge pillar at one end and to the inner rail at another end, and the inner rail being secured to the lower portion of the hinge pillar at one end and configured to extend around a wheel of the electric vehicle and form a portion of a wheel well.

2. The structural assembly according to claim 1, further comprising at least one inner strap comprising opposed flanges, the opposed flanges being secured to opposed walls of the lower portion of the hinge pillar.

3. The structural assembly according to claim 2, further comprising a compression tube extending between the opposed flanges of the inner strap.

4. The structural assembly according to claim 3, wherein the compression tube is welded to the inner strap.

5. The structural assembly according to claim 1, further comprising an integral bulkhead disposed on an interior portion of the s-brace.

6. The structural assembly according to claim 5, wherein the integral bulkhead is a separate component welded to the s-brace.

7. The structural assembly according to claim 1, wherein the s-brace is secured to the inner rail and the lower portion of the hinge pillar with mechanical fasteners.

8. The structural assembly according to claim 1, wherein the s-brace comprises integral stiffening beads.

9. The structural assembly according to claim 1, further comprising:
    an inner rocker extending along an inboard portion of the rocker; and
    a tube cap secured to a front end portion of the inner rocker,
    wherein the tube cap is further secured to the lower portion of the hinge pillar.

10. The structural assembly according to claim 9, further comprising a compression tube extending through the tube cap and between the inner rocker and the rocker.

11. The structural assembly according to claim 1, further comprising a pillar reinforcement secured to an inner side of the lower portion of the hinge pillar.

12. The structural assembly according to claim 1, wherein the subframe rear mount, the battery cage longitudinal member, the rocker, the hinge pillar, and the rail torque unit are secured to each other with mechanical fasteners.

13. The structural assembly according to claim 1, wherein the s-brace is secured to an exterior of the lower portion of the hinge pillar.

14. The structural assembly according to claim 1, wherein the subframe rear mount is a separate component secured at one end to a subframe and at its other end to the battery cage longitudinal member.

15. A structural assembly for use in an electric vehicle having a lower body frame and a battery pack secured within the lower body frame and a subframe extending across a front suspension of the electric vehicle, the structural assembly comprising:
    a subframe rear mount;
    a battery cage longitudinal member secured to the subframe rear mount;
    a rocker extending along and secured to the battery cage longitudinal member;
    a hinge pillar comprising a lower portion, the lower portion of the hinge pillar secured to the rocker;
    a rail torque unit comprising an s-brace and an inner rail, the s-brace being secured to the lower portion of the hinge pillar at one end and to the inner rail at another end, and the inner rail being secured to the lower portion of the hinge pillar at one end and configured to extend around a wheel of the electric vehicle and form a portion of a wheel well; and
    at least one inner strap comprising opposed flanges, the opposed flanges being secured to opposed walls of the lower portion of the hinge pillar.

16. The structural assembly according to claim 15, further comprising a compression tube extending between the opposed flanges of the inner strap.

17. An electric vehicle having a lower body frame and a battery pack secured within the lower body frame and a subframe extending across a front suspension of the electric vehicle, the electric vehicle comprising:
    a subframe extending from a front end of the electric vehicle proximate a front end portion of the battery pack, the subframe comprising opposed arms extending along opposed front wheel wells of the electric vehicle;
    opposed structural assemblies, each structural assembly comprising:
        a subframe rear mount secured to an end of one of the opposed arms of the subframe;
        a battery cage longitudinal member secured to the subframe rear mount;
        a rocker extending along and secured to the battery cage longitudinal member;
        a hinge pillar comprising a lower portion, the lower portion of the hinge pillar secured to the rocker; and
        a rail torque unit comprising an s-brace and an inner rail, the s-brace being secured to the lower portion of the hinge pillar at one end and to the inner rail at another end, and the inner rail being secured to the lower portion of the hinge pillar at one end and configured to extend around a wheel of the electric vehicle and form a portion of a wheel well.

18. The electric vehicle according to claim 17, wherein each structural assembly further comprises at least one inner strap comprising opposed flanges, the opposed flanges being secured to opposed walls of the lower portion of the hinge pillar.

19. The structural assembly according to claim 18, wherein each structural assembly further comprises a compression tube extending between the opposed flanges of the inner strap.

20. The structural assembly according to claim 17, wherein each structural assembly further comprises an integral bulkhead disposed on an interior portion of the s-brace.

\* \* \* \* \*